I. H. BLACK.
TROLLEY HARP.
APPLICATION FILED APR. 7, 1910.
989,323.
Patented Apr. 11, 1911.
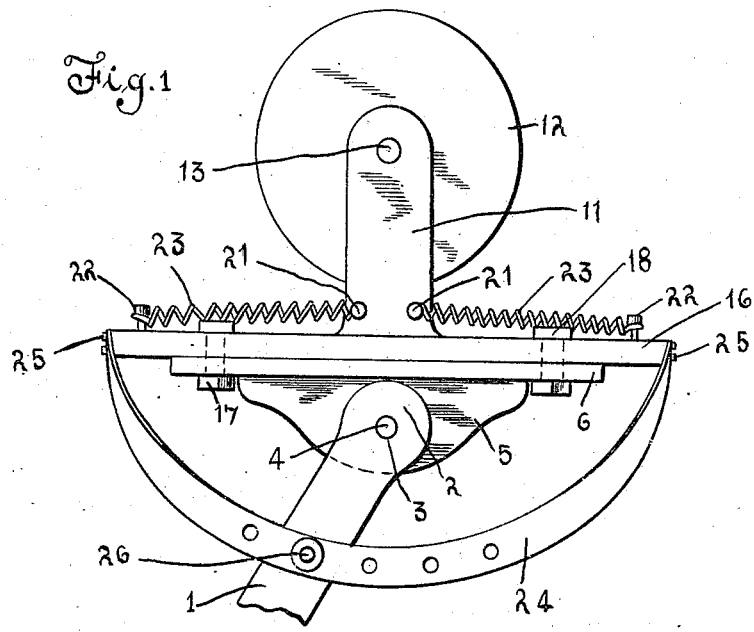
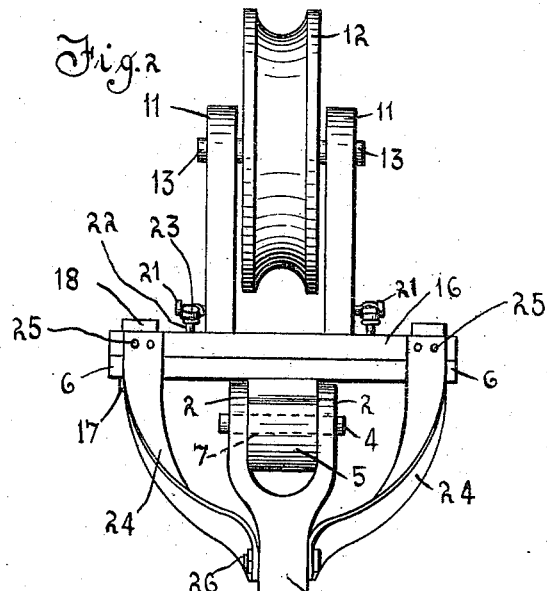
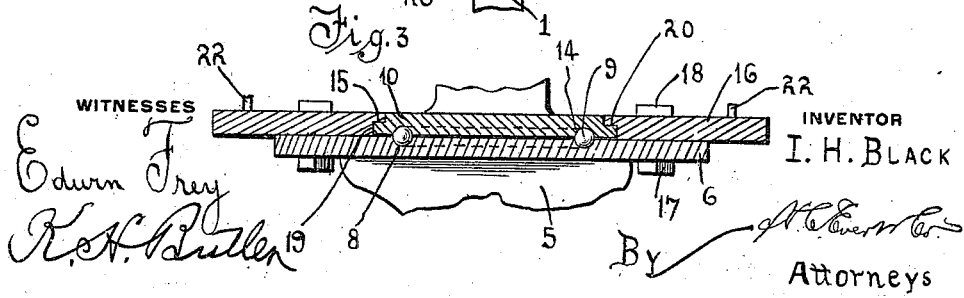
WITNESSES
Edwin Frey
K. H. Butler
INVENTOR
I. H. Black
By
Attorneys

UNITED STATES PATENT OFFICE.

IRA H. BLACK, OF CARNEGIE, PENNSYLVANIA.

TROLLEY-HARP.

989,323.

Specification of Letters Patent. Patented Apr. 11, 1911.

Application filed April 7, 1910. Serial No. 553,938.

*To all whom it may concern:*

Be it known that I, IRA H. BLACK, a citizen of the United States of America, residing at Carnegie, in the county of Allegheny and State of Pennsylvania, have invented certain new and useful Improvements in Trolley-Harps, of which the following is a specification, reference being had therein to the accompanying drawing.

This invention relates to trolley harps, and the object of my invention is to provide a harp with novel and reliable means for adjustably supporting a trolley wheel whereby it can laterally adjust itself to the curvature of a wire or any irregularities in a trolley wire or electric conductor.

A further object of my invention is to swivel a trolley wheel upon a trolley harp and provide a trolley harp with simple and effective means for normally retaining the trolley wheel in position to travel upon a straight wire or conductor, the harp by which this is accomplished being simple in construction, durable, free from injury by ordinary use, and efficient as a means for reducing the displacement of trolley wheels to a minimum.

With the above and such other objects in view as may hereinafter appear, the invention consists of the novel construction, combination and arrangement of parts to be hereinafter specifically described and then claimed.

Reference will now be had to the drawing forming a part of this specification, wherein there is illustrated a preferred embodiment of the invention, but it is to be understood that the structural elements thereof can be varied or changed, as to the size, shape and manner of assemblage without departing from the scope of the appended claims.

In the drawing:—Figure 1 is a side elevation of a trolley harp constructed in accordance with my invention, Fig. 2 is a front elevation of the same, and Fig. 3 is a longitudinal sectional view of a portion of the harp.

In the accompanying drawing the reference numeral 1 denotes a trolley pole having the upper end thereof bifurcated to provide arms 2 and these arms are apertured, as at 3 to receive a transverse pin 4.

5 denotes a central longitudinal depending web carried by a plate 6, and this web is provided with an opening 7 adapted to receive the pin 4. The top surface of the plate 6 is provided with a central annular ball race 8 adapted to hold anti-friction balls 9 and movably mounted upon these balls is the base 10 of the trolley harp, said harp comprising oppositely disposed vertical arms 11 between which is revolubly supported a trolley wheel 12 by a transverse pin 13 mounted in said arms. The trolley base 10 is circular in plan and has the under face thereof provided with a ball race 14 to receive the anti-friction balls 9, while the edges of the base 10 are cut away to provide an annular shoulder 15.

16 denotes a rectangular retaining plate secured to the plate 6 by a plurality of bolts 17 and nuts 18. The retaining plate 16 is provided with a central opening 19 having an annular overhanging flange 20 adapted to rest upon the shoulder 15 and retain the base 10 of the harp upon the anti-friction balls 9.

21 denotes outwardly extending pins carried by the arms 11 of the harp and 22 denotes posts located adjacent to the ends of the plate 16. Connecting the posts 22 and the pins 21 are retractile coiled springs 23, and these springs are arranged whereby a trolley harp will be normally held with the trolley wheel 12 thereof in longitudinal alinement with the plate 16.

24 denotes curved and twisted metallic straps having the ends thereof secured to the ends of the plate 16, as at 25 while the sides of said straps are riveted or otherwise secured, as at 26 to the sides of the pole 1. These straps prevent the plates 6 and 16 from rocking or shifting relatively to the trolley pole 1. The plate 6 is pivoted on the upper end of the harp 1 so that the plate can be adjusted. It will be noted that the straps 24 are provided with openings for the pin or rivet 26, so as to maintain the plate 6 in its adjusted position, the pivoting of the plate allowing for the adjusting thereof and it is essential to pivot the plate 6 or otherwise the same could not be adjusted.

It is thought that the operation and utility of my trolley harp will be apparent without further description, and it is preferable to construct the parts thereof of a non-corrodible material while the wheel 12 is made of strong and durable metal.

Having now described my invention what I claim as new, is:—

1. In a trolley, the combination with a pole having the upper end thereof bifurcated, of a web mounted in the bifurcated end of said pole, a plate supported by said web, a harp base revolubly mounted upon said plate, arms carried by said harp base, a trolley wheel revolubly mounted between said arms, a retaining plate secured to the first mentioned plate and adapted to retain said trolley base thereon, retractile springs connected to said arms and to said retaining plate and adapted to hold said trolley wheel in longitudinal alinement with said retaining plate, and curved twisted straps secured to the ends of said retaining plate and the sides of said pole.

2. In a trolley, the combination with a pole, of a web mounted in the upper end thereof, a plate carried by said web, a harp base revolubly mounted upon said plate, anti-friction balls interposed between said harp base and said plate, arms carried by said harp base, a trolley wheel revolubly mounted between said arms, a retaining plate secured to the first mentioned plate and adapted to retain said harp base thereon, curved twisted straps connected to the ends of said retaining plate and to the sides of said pole, and means located upon said retaining plate and connecting with said arms and adapted to normally retain said trolley wheel in longitudinal alinement with said retaining plate.

In testimony whereof I affix my signature in the presence of two witnesses.

IRA H. BLACK.

Witnesses:
 KARL H. BUTLER,
 JOHN L. STEPHANY.

---

Copies of this patent may be obtained for five cents each, by addressing the "Commissioner of Patents, Washington, D. C."